United States Patent [19]
Kondo

[11] Patent Number: 4,580,664
[45] Date of Patent: Apr. 8, 1986

[54] SLIDING CALIPER DISC BRAKE

[75] Inventor: Toshio Kondo, Okazaki, Japan

[73] Assignee: Aisin Seiki Kabushiki Kaisha, Kariya, Japan

[21] Appl. No.: 607,312

[22] Filed: May 4, 1984

[30] Foreign Application Priority Data

May 13, 1983 [JP] Japan .................. 58-071914[U]

[51] Int. Cl.$^4$ .................. F16D 55/224; F16D 65/09
[52] U.S. Cl. .................. 188/73.34; 188/73.38; 188/73.39; 188/73.44; 188/205 A
[58] Field of Search .................. 188/72.4, 72.5, 72.6, 188/73.31, 73.34, 73.39, 73.44, 73.45, 73.38, 205 A

[56] References Cited

U.S. PATENT DOCUMENTS 3,625,314 12/1971 Rinker .................. 188/72.4
4,369,862 1/1983 Seki .................. 188/73.45

FOREIGN PATENT DOCUMENTS 58-39824 3/1983 Japan .................. 188/72.4

Primary Examiner—Bruce H. Stoner, Jr.
Assistant Examiner—Richard R. Diefendorf
Attorney, Agent, or Firm—Oblon, Fisher, Spivak, McClelland & Maier

[57] ABSTRACT

A sliding caliper disc brake includes a caliper slidably mounted on a fixed torque-taking member to urge one friction pad onto one side of a rotatable disc and having a fluid actuated piston which urges the other friction pad onto the other side of the rotatable disc. The caliper is connected to the torque member by a pin so as to permit sliding of the caliper in an axial direction of the rotatable disc and also pivoting of the caliper with respect to the torque member. The pivoting of the caliper in the inward direction is restrained by an extension which is formed on the caliper and is in contact with the torque member while the pivoting of the caliper in the outward direction is restrained by a link plate which is oscillatingly disposed on one friction pad and is in contact with the caliper.

4 Claims, 4 Drawing Figures

1

SLIDING CALIPER DISC BRAKE

BACKGROUND OF THE INVENTION

1. Field of the Invention

This invention relates to disc brakes, and more particularly to sliding caliper disc brakes for automobile vehicles.

2. Discussion of the Background

Conventional sliding caliper disc brakes include inner and outer friction pads which are slidably mounted on a fixed torque-taking member and are positioned at both sides of a rotatable disc, respectively, and a caliper which is slidably mounted on the torque member so as to straddle the minor portion of the periphery of the rotatable disc. The caliper has a forked arm which is brought into contact with a rear surface of a back plate of the outer friction pad to thereby urge the outer friction pad onto one side of the disc. The caliper also has a cylinder within which a fluid actuated piston is positioned so as to be brought into contact with a rear surface of a back plate of the inner friction pad to thereby urge the inner friction pad onto the other side of the disc. The connection between the caliper and the torque member is completed at the side of the inner friction pad by a single pin to permit sliding of the caliper in a direction parallel to the axis of disc rotation and also pivoting of the caliper about the pin. This pivoting of the caliper on the torque member in an outward direction about the axis of the pin is restrained by the contact between an extension formed in the caliper and an extension formed in the torque member while pivoting of the caliper in an inward direction about the axis of the pin is restrained by the contact between a bridge portion of the caliper and the back plate of the inner friction pad by means of the leaf spring means. The pin is connected to the caliper by means of a screw and is slidably inserted within an opening in the torque member. A resilient sealing boot protects the sliding surface of the pin from the ingress of dirt and moisture.

In such prior sliding caliper disc brakes, when the exchange of the friction pads is desired, the screw has to be released for removal of the caliper from the torque member. In assembling the caliper, furthermore, the screw should in assembly be turned with a high degree of accuracy between the caliper and the pin to thereby secure the smooth sliding of the caliper. Therefore, less maintenance and repairs are required. In addition, since the caliper is supported with respect to the torque member at only the side of the inner friction pad, the rigidity required to support the caliper with respect to the torque member will be small. The pivoting force of the caliper in the inward direction is received by the portion of the torque member to support the pad by means of the leaf spring means and the back plate of the inner friction pad and therefore the sliding resistances will occur between the caliper and the leaf spring means and between the leaf spring means and the back plate of the inner pad upon operation of the brakes. Thus, the braking force may be reduced.

SUMMARY OF THE INVENTION

Therefore, it is an object of the present invention to provide a new and improved sliding caliper disc brake which obviates the prior drawbacks mentioned above.

It is another object of the present invention to provide a new and improved sliding caliper disc brake wherein friction pads can be easily exchanged.

It is still another object of the present invention to provide a new and improved sliding caliper disc brake wherein the rigidity required to support a caliper with respect to a torque member increases.

It is still another object of the present invention to provide a new and improved sliding caliper disc brake wherein the braking force is not be damaged excessively.

According to the present invention, there is provided a sliding caliper disc brake comprising a fixed torque member, inner and outer friction pads slidably mounted on the torque member at both sides of a rotatable disc, a caliper slidably mounted on the torque member so as to straddle a portion of the periphery of the rotatable disc, the caliper having a forked arm which is brought in contact with a back plate of the outer friction pad and a cylinder which receives therein a fluid actuated piston which is, in turn, brought in contact with a back plate of the inner friction pad, the back plate of the outer friction pad having at the both ends thereof portions which are axially slidably supported on supporting portions formed on the both ends of the torque member, a pin for connecting the caliper to the torque member so as to permit sliding of the caliper in a direction parallel to the axis of disc rotation and also pivoting of the caliper with respect to the torque member, and means for restraining the pivoting of the caliper about the pin comprising an extension formed on the caliper at the side of the outer friction pad and being in contact with the supporting portion of the torque member from the side of the outer periphery of the rotatable disc to thereby restrain pivoting of the caliper in the inward direction and a link plate oscillatingly and removably disposed on a boss portion which is provided on the back plate of the outer friction pad, both oscillating ends of the link plate being in contact with opposed claw portions which are provided on the ends of the arm of the caliper by means of a leaf spring from the side of the outer periphery of the rotatable disc to thereby restrain the pivoting of the caliper in the outward direction.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

Figure 1:
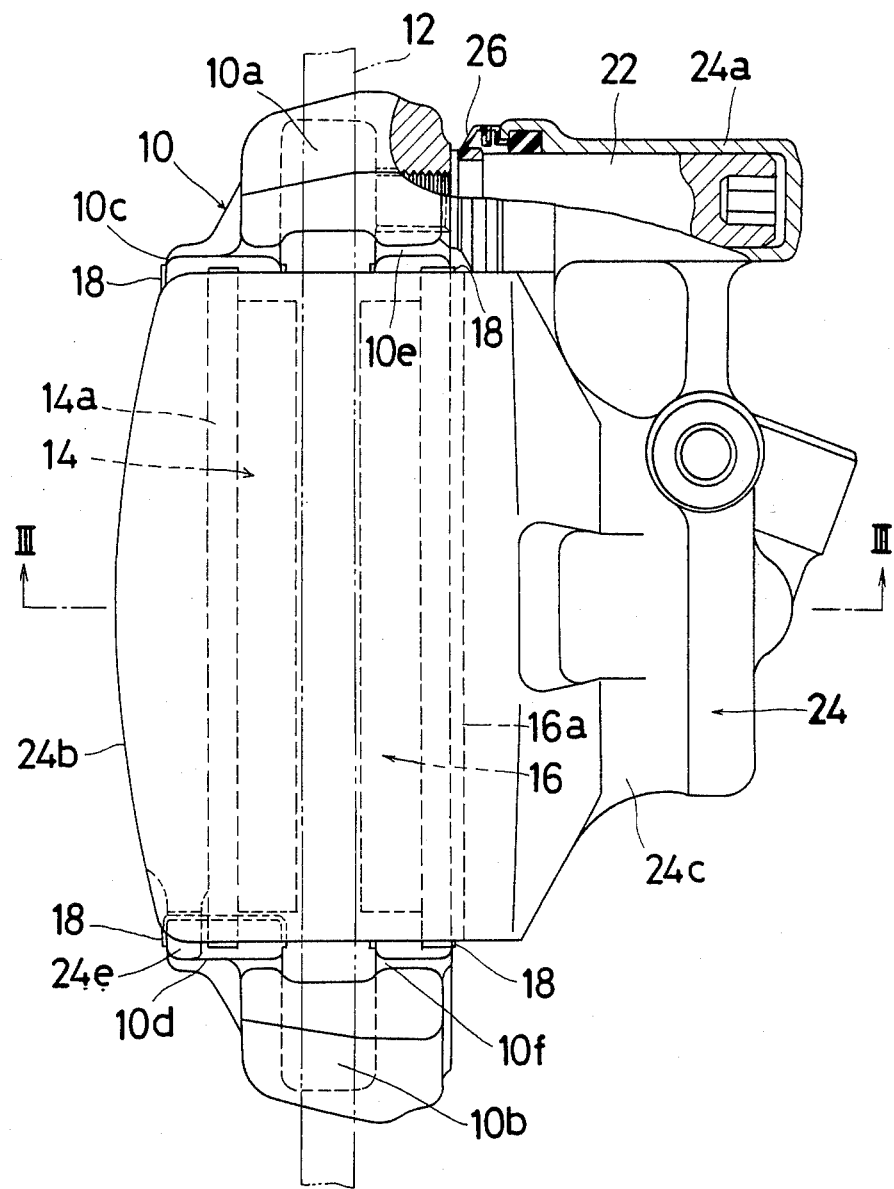
FIG. 1 is a front elevational view, partly in section, of a sliding caliper disc brake according to the present invention.

Referring now to the drawings, the sliding caliper disc brake includes a fixed torque member 10 which is secured to a portion of a vehicle body such as knuckle arm, not shown, and has bridge portions 10a and 10b at both sides thereof. These portions 10a and 10b overhang a portion of the periphery of a rotatable disc 12 so as to thereby support outer and inner friction pads 14 and 16. The outer and inner friction pads 14 and 16 have back plates 14a and 16a which are slidably disposed in an axial direction of the rotatable disc 12 through means of anti-rattle springs 18 of a leaf spring type which are disposed at upper and lower ends of the back plates 14a and 16a. The springs 18 are formed of the material having anti-corrosion such as stainless steel and bias the friction pads in the direction of the periphery of the rotatable disc 12 and also in the direction of the rotation of the disc 12. Each spring 18 has a bent portion 18a of approximate U-shape in cross section and a claw portion 18b and is positioned on a corresponding convex supporting portion 10c, 10d, 10e or 10f of the torque member 10. The portions 10c and 10d are opposed to each other in the direction of the disc rotation as well as the portions 10e and 10f.

As will be shown in FIG. 1, a support pin 22 is threaded through the torque member 10 at the right side of the rotatable disc 12 and extends rightwardly. A caliper member 24 has a cylindrical portion 24a which receives the pin 22 therein so that the caliper member 24 is axially slidable and is pivotable. A resilient sealing boot 26 is provided between the pin 22 and the cylindrical portion 24a to thereby protect the sliding portions between the pin 22 and the cylindrical portion 24a from the ingress of dirt and moisture. The caliper 24 is formed so as to surround both of the pads 14 and 16 and the rotatable disc 12. The caliper 24 has a forked arm 24b which is brought in contact with the back plate 14a of the outer friction pad 14 to urge the pad 14 onto one side of the rotatable disc 12 and a cylinder 24c which receives a fluid actuated piston 28 which is, in turn, brought in contact with the back plate 16a of the inner pad 16 to urge the pad 16 onto the other side of the rotatable disc 12. The arm 24b and the cylinder 24c are connected to each other by means of a bridge portion 24d.

Figure 2:
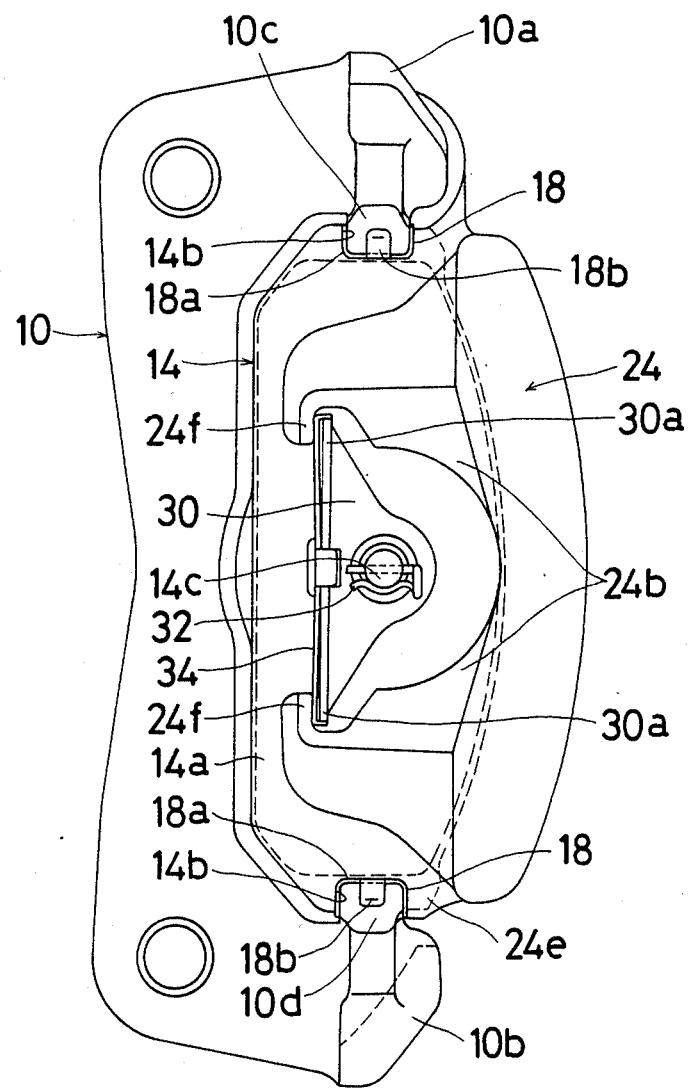
FIG. 2 is a left side view of the brake illustrated in FIG. 1.

The back plate 14a of the outer friction pad 14 has concave portions 14b, at the upper and lower ends thereof in FIG. 2, within which convex supporting portions 10c and 10d of the torque member 10 are positioned through means of anti-rattle springs 18 so that the outer pad 14 is slidable only in the axial direction. Means for restraining the pivoting of the caliper 24 about the pin 22 are provided and comprise a link plate 30 which is oscilatingly and removably disposed on the back plate 14a of the outer friction pad 14 and an extension 24e formed on the caliper 24. At the side of the outer friction pad 14, the extension 24e is in contact with the convex supporting portion 10d through means of the anti-rattle spring 18 from the side of the outer periphery of the rotatable disc 12 and therefore the pivoting of the caliper 24 in the inward direction is restrained. The link plate 30 is oscillatingly and removably disposed on a boss portion 14c which is provided on the center of the rear surface of the back plate 14a and is prevented from coming off by means of a clip 32 which is positioned on the boss portion 14c. Both of oscillating ends 30a of the link plate 30 are constructed so as to be in contact with opposed claw portions 24f to thereby restrain the pivoting of the caliper 24 in the outward direction. The claw portions 24f are provided with the ends of the arm 24b of the caliper 24 through means of a leaf spring 34 from the side of the outer periphery of the rotatable disc 12. The leaf spring 34 is made of anti-corrosion material such as stainless steel and is pressfitted to the link plate 30 to thereby bias the caliper 24 inwardly. Since the pivoting of the caliper 24 in the outward direction is restrained by the contact between the oscillating ends 30a of the plate 30 and the claw portions 24f of the caliper 24, excessive sliding resistances will not occur during operation of the brakes and the braking force will not be excessively reduced. Furthermore, the oscillating ends 30d of the plate 30 are securely brought in contact with the claw portions 24f of the caliper 24 by the oscillating movement of the plate 30 and therefore the pivoting force in the outward direction applied to the caliper 24 due to the vibration of the vehicle body and the like is uniformly distributed to the oscillating ends 30a from the claw portions 24f. Thus, it is not necessary to excessively increase the rigidity of the above portions 24f and 30a.

Figure 3:
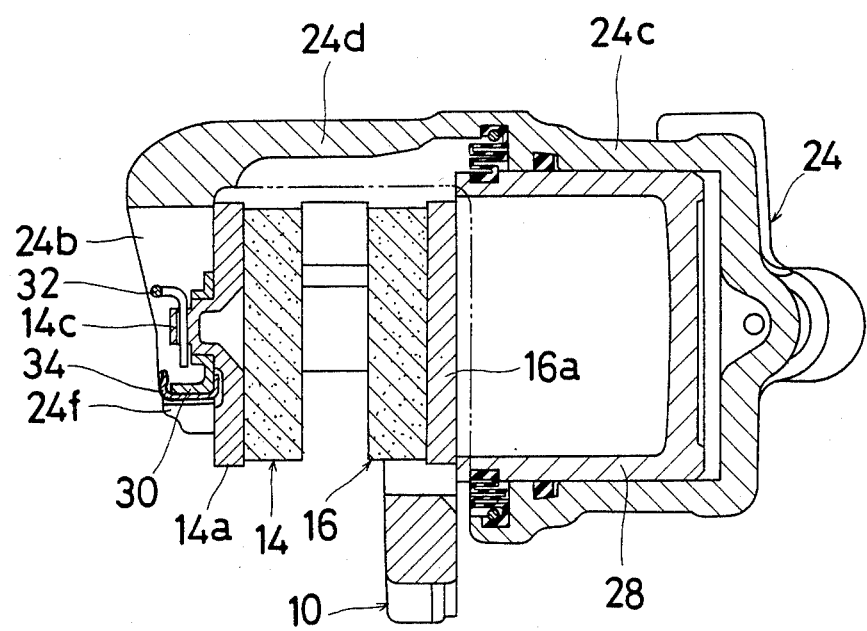
FIG. 3 is a cross sectional view taken along the line III—III of FIG. 1
Figure 4:
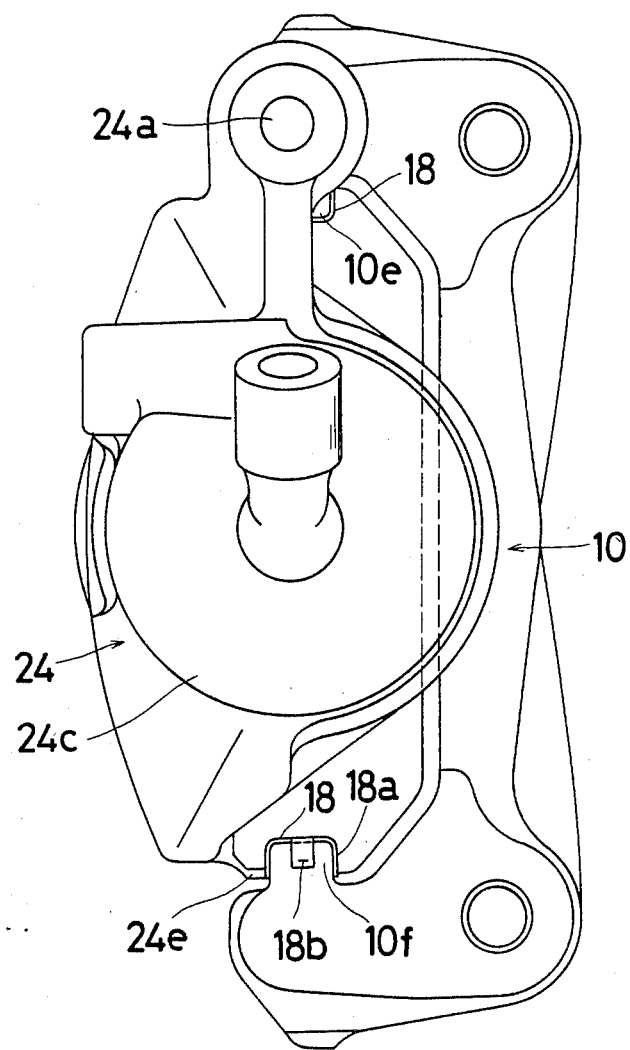
FIG. 4 is a right side view of the brake illustrated in FIG. 1.

When the cylinder 24c receives fluid under pressure, the piston 28 is displaced leftwardly in FIG. 3 and moves the inner friction pad 16 against the adjacent side of the rotatable disc 12 while the caliper 24 is caused to slide rightwardly with respect to the torque member 10 to move the outer friction pad 14 to the opposite side of the rotatable disc 12 by the arm 24b thereof. Thus, the rotatable disc 12 is clamped to complete the brake operation. During the brake operation, even when the torque member 10 is deformed by the reaction force applied thereto through both pads 14 and 16, this will be absorbed by the sliding contact between both pads 14 and 16 and the supporting portions 10c, 10d, 10e and 10f. Accordingly, no excessive force is applied between the pin 22 and the cylindrical portion 24a of the caliper 24 and the smooth sliding of the caliper 24 is secured.

When the clip 32 is removed from the boss portion 14c by a suitable tool and the link plate 30 is then removed from the boss portion 14c, the caliper 24 can be pivoted about the pin 22 directed the outer periphery of the rotatable disc 12. Thus, exchange of the pads 14 and 16 will be easily completed. After the pads 14 and 16 are exchanged, the reverse steps will be conducted until assembly is complete.

The above mentioned caliper 24 is supported on the torque member 10 by means of the pin 22 at the side of the friction pad 16 and is supported, at the side of the outer friction pad 14, on the torque member 10 by means of the means for restraining the pivoting of the caliper 24. Therefore, the degree of rigidity required to support the caliper 24 with respect to the torque member 10 will increase.

By the foregoing discussion, there has been disclosed that the supporting portions 10c and 10d of the torque member 10 are of convex configuration and the portions 14b of the outer pad 14 are of concave configuration. However, the supporting portions 10c and 10d may be of concave configuration and the portions 14b of the outer pad 14 may be of convex configuration. It will be further appreciated that various additions, substitutions, modifications and omissions may be made thereto without departing from the spirit of the invention.

What is claimed is:

1. A sliding caliper disc brake having a rotatable disc, comprising:

a fixed torque member having first and second supporting portions formed at opposite ends in a circumferential direction of said rotatable disc;

inner and outer friction pads slidably mounted on said torque member at either side of said rotatable disc, said inner friction pad having a back plate and said outer friction pad having a back plate and a boss portion;

a caliper slidably mounted on said torque member so as to straddle a portion of the periphery of said rotatable disc, said caliper having a forked arm which is brought in contact with said back plate of said outer friction pad and a cylinder which receives therein a fluid actuated piston which is, in turn, brought in contact with said back plate of said inner friction pad;

said back plate of said outer friction pad being provided at opposite ends thereof in a circumferential direction of said rotatable disc, with first and second portions, respectively, which are axially slidably supported on said first and second supporting portions of said torque member;

a pin for connecting said caliper to said torque member so as to permit sliding of said caliper in a direction parallel to an axis of disc rotation and for pivoting of said caliper with respect to said torque member; and means for preventing the pivoting of said caliper about said pin toward a radially inward direction and which further comprises an extension formed on said caliper at one side of said outer friction pad, said extension being in contact with one of said supporting portions of said torque member from an outer peripheral side of said rotatable disc; and means for preventing the pivoting of said caliper about said pin toward a radially outward direction and which further comprises a link plate removably disposed for oscillation on said boss portion of said back plate of said outer friction pad, and a leaf spring mounted on said caliper, wherein said link plate includes portions which are in contact with opposed claw portions provided on said forked arm of said caliper by means of said leaf spring from an outer peripheral side of said rotatable disc.

2. A sliding caliper disc brake as set forth in claim 1, wherein each of said first and second portions or said back plate of said outer friction pad has a concave configuration for receiving therein one of said supporting portions of said torque member and wherein said supporting portions of said torque member are of a convex configuration.

3. A sliding caliper disc brake as set forth in claim 1, further comprising a clip for securing said link plate to said back plate of said outer friction pad.

4. A sliding caliper disc brake as set forth in claim 1, further comprising spring means for slidably mounting each of said inner and outer friction pads on said torque member.

* * * * *